(12) United States Patent
Jalali Dil et al.

(10) Patent No.: US 11,987,700 B2
(45) Date of Patent: May 21, 2024

(54) BARRIER POLYMER COMPOSITIONS

(71) Applicant: POLYVALOR, SOCIÉTÉ EN COMMANDITE, Montréal (CA)

(72) Inventors: Ebrahim Jalali Dil, Montréal (CA); Abdellah Ajji, Mont-Royal (CA)

(73) Assignee: POLYVALOR, LIMITED PARTNERSHIP, Montréal (CA)

(*) Notice: Subject to any disclaimer, the term of this patent is extended or adjusted under 35 U.S.C. 154(b) by 0 days.

(21) Appl. No.: 17/628,889

(22) PCT Filed: Jul. 20, 2020

(86) PCT No.: PCT/CA2020/051003
§ 371 (c)(1),
(2) Date: Jan. 20, 2022

(87) PCT Pub. No.: WO2021/012042
PCT Pub. Date: Jan. 28, 2021

(65) Prior Publication Data
US 2022/0251380 A1 Aug. 11, 2022

Related U.S. Application Data

(60) Provisional application No. 62/876,698, filed on Jul. 21, 2019.

(51) Int. Cl.
*C08L 77/02* (2006.01)
*C08J 5/18* (2006.01)
*C08L 23/12* (2006.01)

(52) U.S. Cl.
CPC .............. *C08L 77/02* (2013.01); *C08J 5/18* (2013.01); *C08L 23/12* (2013.01); *C08J 2323/06* (2013.01); *C08J 2323/12* (2013.01); *C08J 2367/04* (2013.01); *C08J 2377/02* (2013.01); *C08J 2423/06* (2013.01); *C08J 2423/08* (2013.01); *C08J 2467/02* (2013.01); *C08J 2471/02* (2013.01); *C08J 2477/02* (2013.01)

(58) Field of Classification Search
CPC .... C08L 23/053; C08L 23/0861; C08L 23/10; C08L 23/12; C08L 23/14; C08L 23/145; C08L 2205/03; C08L 2201/14
See application file for complete search history.

(56) References Cited

U.S. PATENT DOCUMENTS

| 5,188,784 A | 2/1993 | Kamal et al. | |
| 2013/0146194 A1* | 6/2013 | Kawaguchi | C08L 77/02 152/450 |

FOREIGN PATENT DOCUMENTS

| EP | 2610311 A1 | 7/2013 |
| JP | 05032831 A * | 2/1993 |
| WO | 8802764 | 4/1988 |
| WO | 2015053464 A1 | 4/2015 |

OTHER PUBLICATIONS

JP 05032831 A machine translation (Feb. 1993).*
Salehiyan et al., "Mechanism of Thermal Degradation-Induced Gel Formation in Polyamide 6/Ethylene Vinyl Alcohol Blend Nanocomposites Studied by Time-Resolved Rheology and Hyphenated Thermogravimetric Analyzer Fourier Transform Infrared Spectroscopy Mass Spectroscopy: Synergistic Role of Nanoparticles and Maleic-anhydride-Grafted Polypropylene", ACS Omega, May 2019, 4, 9659-9582.
Yeh et al., "Barrier Resistance of Polyethylene, Polyethylene/Modified Polyamide, and Polyethylene/Blends of Modified Polyamide and Ethylene Vinyl Alcohol Bottles Against Permeation of Polar and Nonpolar Mixed Solvents", Journal of Applied Polymer Science, vol. 97, 1333-1344 (2005). (The year of publication is sufficiently earlier than the effective U.S. filing date so that the particular month of publication is not an issue.).
Berget et al., "On the Use of Interfacial Tension Parameter to Predict Reduction of Friction by Mold Coatings in Injection Molding of Polyamide 6", AIP Conference Proceedings 1779, 020006, Oct. 31, 2016.
Harkins et al., "Films. The Spreading of Liquids and the Spreading Coefficient", The Journal of the American Chemical Society with which has been incorporated the American Chemical Journal, vol. 44, Dec. 1922, No. 12.
Jalali Dil et al., "Localization of micro and nano-silica particles in a high interfacial tension poly(lactic acid)/low density polyethylene system", Polymer 77 (Sep. 2015) 156-166.
Jalali Dil et al., "Morphology, miscibility and continuity development in poly(lactic acid)/poly(butylene adipate-co-terephthalate) blends", Polymer 68 (May 2015) 202-212.
Kamal et al., "The Development of Laminar Morphology During Extrusion of Polymer Blends", Polymer Engineering and Science, Mid-Jan. 1995, vol. 35, No. 1.
Khoshkava et al., "Effect of Cellulose Nanocrystals (CNC) Particle Morphology on Dispersion and Rheological and Mechanical Properties of Polypropylene/CNC Nanocomposites", ACS Appl. Mater. Interfaces, May 2014, 6, 8146-8157.
P. M. Subramanian, "Permeability Barriers by Controlled Morphology of Polymer Blends", Polymer Engineering and Science, Mid-Jun. 1985, vol. 25, No. 8.
Subramanian et al., "Laminar Morphology in Polymer Blends: Structure and Properties", Polymer Engineering and Science, Mid-May 1987, vol. 27, No. 9.
Wu, "Calculation of Interfacial Tension in Polymer Systems", J. Polymer. Sci.: Part C, No. 34, pp. 19-30 (1971)—(The year of publication is sufficiently earlier than the effective U.S. filing date so that the particular month of puglication is not an issue).

(Continued)

*Primary Examiner* — Ana L. Woodward
(74) *Attorney, Agent, or Firm* — Bereskin & Parr LLP/S.E.N.C.R.L., s.r.l.

(57) ABSTRACT

The present application relates to polymer compositions that provide barrier properties to oxygen, water vapor and/or hydrocarbons, to polymer film or sheet comprising the polymer composition and to their use in the manufacture or preparation of plastic material and/or plastic packaging. The present application also relates to a method of reducing oxygen water vapor and/or hydrocarbons permeability in plastic material and/or plastic packaging.

7 Claims, 3 Drawing Sheets

(56) References Cited

OTHER PUBLICATIONS

Zolali et al., "Partial to complete wetting transitions in immiscible ternary blends with PLA: the influence of interfacial confinement", Soft Matter, Mar. 2017, 13, 2844.
Ravati et al., "Tunable morphologies for ternary blends with poly(butylene succinate): Partial and complete wetting phenomena", Polymer 54 (Apr. 2013) 3271-3281.
Ravati et al., "High Performance Materials Based on a Self-Assembled Multiple-Percolated Ternary Blend", AIChE Journal, Aug. 2014, vol. 60, No. 8, pp. 3005-3012.
English Translation—Machine Translation of WO2015053464A1, "Biodegradable Resin Compound and Biodegradable Packing Material", published on Apr. 16, 2015.
Cabedo et al., "Optimization of Biodegradable Nanocomposites Based on aPLA/PCL Blends for Food Packaging Applications", Macromol. Symp. 2006, 233, 191-197. (The year of publication is sufficiently earlier than the effective U.S. filing date so that the particular month of publication is not an issue).

* cited by examiner

BARRIER POLYMER COMPOSITIONS

CROSS-REFERENCE TO RELATED APPLICATIONS

The present application is a 35 USC 371 national stage entry of PCT/CA2020/051003 filed on Jul. 20, 2020 and which claims priority to U.S. application No. 62/876,698 filed on Jul. 21, 2019. These documents are hereby incorporated herein by reference in theft entirety.

FIELD

The present application relates to polymer compositions that provide barrier properties to molecules such as oxygen, water vapor and/or hydrocarbons, to polymer film or sheet comprising the polymer composition and to their use in the manufacture or preparation of plastic material and/or plastic packaging. The present application also relates to a method of reducing oxygen permeability in plastic material and/or plastic packaging.

INTRODUCTION

Plastic packaging plays a major role in food packaging industry. One of the main requirements for food packaging is protecting food from the environment. This is usually done using a multilayer structure in which one of the layers is made of a high barrier material. Polyamide (PA) is one of the most common high barrier plastics used in flexible and rigid packaging. However, the high cost of PA compared to commodity polymers such as polypropylene (PP) and polyethylene (PE) increases the final cost of barrier packaging. For example in the multilayer PE-based film with PA barrier layer used commonly in big block cheese packaging or in flexible tray applications (also known as forming applications), the PA layer is only 16-20% of the weight of the film but it costs about half of the total material cost. This indicates the significant role of the cost of barrier layer polymer (in this case PA) on the final cost of barrier packages.

Blending of high barrier materials with low cost polymers has been presented as a potential strategy to achieve high permeability at lower cost. Most of previous works consist of binary blends of low cost PE or PP with a high barrier polymer such as PA, PET or EVOH. Subramanian et al. reported binary blends of PA and PE (1), and of PET and PE (2). Kamal et al. reported binary blends of ethylene vinyl alcohol (EVOH) and PP. (3,4) However, oxygen barrier properties reported for these systems were still much below the acceptable range for food packaging applications.

Recently, bioplastics have been introduced as a solution to reduce the environmental impact of plastic materials. However, bioplastic materials suffer from low barrier properties against oxygen and water vapor. In addition, bioplastics are much more expensive compared to commodity polymers. These two drawbacks have limited significantly the applications of bioplastic in packaging industry especially in food packaging applications.

Considering all of the aforementioned, there is a need to develop materials with barrier properties at a lower cost for the packaging industry, for example in the food packaging industry.

SUMMARY

Accordingly, the present application includes a polymer composition comprising about 32% to 58% w/w of polymer A, about 4% to 20% w/w of polymer B, and about 32% to 58% w/w of polymer C, wherein the polymer A is the most polar among the polymer A, the polymer B and the polymer C;
wherein the polymer C is the least polar among the polymer A, the polymer B and the polymer C;
wherein the polymer B has the lowest oxygen permeability among the polymer A, the polymer B and the polymer C; and
wherein the polymer composition has oxygen permeability lower than that of binary blend polymer A and C.

There is also provided a polymer composition comprising about 32% to 58% w/w of polymer A, about 4% to 20% w/w of polymer B, and about 32% to 58% w/w of polymer C,
wherein the polymer A is the most polar among the polymer A, the polymer B and the polymer C;
wherein the polymer C is the least polar among the polymer A, the polymer B and the polymer C;
wherein the polymer B has the lowest oxygen permeability among the polymer A, the polymer B and the polymer C.

There is further provided a polymer composition comprising about 32% to 58% w/w of polymer A, about 4% to 20% w/w of polymer B, and about 32% to 58% w/w of polymer C,
wherein the polymer A is the most polar among the polymer A, the polymer B and the polymer C;
wherein the polymer C is the least polar among the polymer A, the polymer B and the polymer C;
wherein the polymer B has the lowest oxygen permeability among the polymer A, the polymer B and the polymer C; and
wherein the polymer composition has an oxygen permeability that is less than 900 cc·mil/m$^2$·day.

There is further provided a polymer composition comprising about 32% to 58% w/w of polymer A, about 4% to 20% w/w of polymer B, and about 32% to 58% w/w of polymer C,
wherein the polymer A is the most polar among the polymer A, the polymer B and the polymer C;
wherein the polymer C is the least polar among the polymer A, the polymer B and the polymer C;
wherein the polymer B has the lowest oxygen permeability among the polymer A, the polymer B and the polymer C; and
wherein the polymer composition has an oxygen permeability that is less than 850 cc·mil/m$^2$·day.

In another aspect, the present application includes a polymer film or sheet comprising the polymer composition of the present application.

In another aspect, the present application includes use of the polymer composition of the present application or the polymer film or sheet of the present application in the manufacture or preparation of plastic material and/or plastic packaging.

In another aspect, the present application includes use of the polymer composition of the present application or the polymer film or sheet of the present application in the manufacture or preparation of food packaging.

Accordingly, in another aspect, the present application includes a food packaging comprising the polymer composition of the present application or the polymer film of the present application.

In an aspect, the present application includes a method of reducing oxygen permeability of plastic material and/or plastic packaging comprising incorporating the polymer application composition of the present application or the polymer film of the present application in the plastic material and/or plastic package.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

The embodiments of the application will now be described in greater detail with reference to the attached drawings in which.

DESCRIPTION OF VARIOUS EMBODIMENTS

Figure 1:
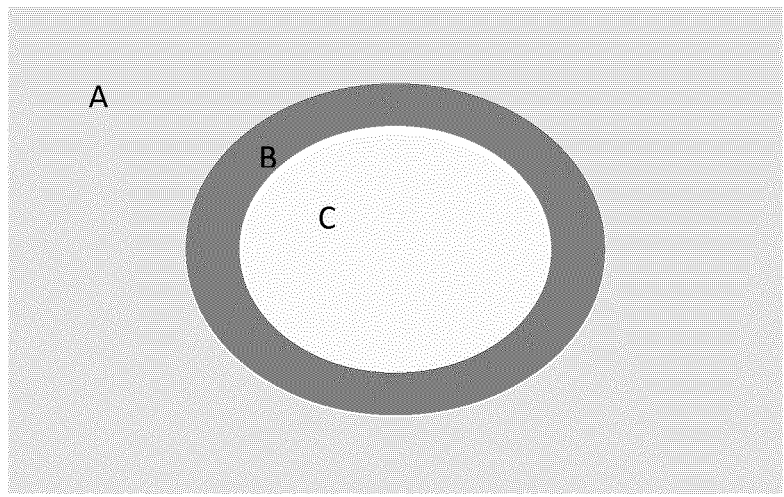
FIG. 1 shows a schematic representation of the morphology and localization of polymers in a blend of three polymers A, B and C.

The various embodiments are hereby presented in a non-limitative manner and as examples only.

Unless otherwise indicated, the definitions and embodiments described in this and other sections are intended to be applicable to all embodiments and aspects of the present application herein described for which they are suitable as would be understood by a person skilled in the art.

The term "polymer composition of the application" or "polymer composition of the present application" and the like as used herein refers to a composition comprising about 32% to 58% w/w of polymer A, about 4% to 20% w/w of polymer B, and about 32% to 58% w/w of polymer C,
 wherein the polymer A is the most polar and the polymer C is least polar among the polymer A, the polymer B and the polymer C;
 wherein the polymer B has the lowest oxygen permeability among the polymer A, the polymer B and the polymer C; and
 wherein the polymer composition has oxygen permeability lower than that of binary blend polymer A and C.

The term "PA" as used herein refers to polyamide.

The term "PE" or "HDPE" as used herein refers to polyethylene.

The term "PP" as used herein refers to polypropylene.

The term "PET" as used herein refers to polyethylene terephthalate.

The term "PLA" as used herein refers to polylactic acid or polylactide.

The term "PBS" as used herein refers to polybutylene succinate.

The term "PBAT" as used herein refers to polybutylene adipate-co-terephthalate.

The term "EVOH" as used herein refers to ethylene vinyl alcohol.

The term "LLDPE" as used herein refers to linear low-density polyethylene.

The term "PE-g-MA" as used herein refers to polyethylene grafted maleic anhydride.

The term "LLDPE-g-MA" as used herein refers to linear low-density polyethylene grafted maleic anhydride.

The term "PP-g-MA" as used herein refers to polypropylene grafted maleic anhydride.

The term "organoclay" as used herein refers to organically modified montmorillonite nanoparticles.

The term "bioplastic" as used herein refers to a polymer of one or more types of repeating units. The polymer satisfies at least one of the following conditions: (i) it is completely or partially derived from a bio-based source, and (ii) it is biodegradable or compostable. Non-limiting examples of bioplastic materials include PLA, PBAT, Starch blends, Polycaprolactone (PCL), PBS, polybutylene succinate adipate (PBSA), Polyhydroxyalkanoates (PHA), bio-based PET, bio-based PA, bio-based-PE and bio-based-PP.

As used herein, the term "polymer film" refers to structures, for example plastic structures, with a thickness of less than 250 microns, and the term "polymer sheet" refers to structures, for example plastic structures, with a thickness greater than 250 microns, as referred to for example in ASTM D883 on Standard Terminology Relating to Plastics.

The term "and/or" as used herein means that the listed items are present, or used, individually or in combination. In effect, this term means that "at least one of" or "one or more" of the listed items is used or present. The term "and/or" with respect to pharmaceutically acceptable salts and/or solvates thereof means that the compounds of the application exist as individual salts or hydrates, as well as a combination of, for example, a salt of a solvate of a compound of the application.

As used in the present application, the singular forms "a", "an" and "the" include plural references unless the content clearly dictates otherwise. For example, an embodiment including "a compound" should be understood to present certain aspects with one compound or two or more additional compounds.

In embodiments comprising an "additional" or "second" component, such as an additional or second compound, the second component as used herein is chemically different from the other components or first component. A "third" component is different from the other, first, and second components, and further enumerated or "additional" components are similarly different.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The present description refers to a number of chemical terms and abbreviations used by those skilled in the art. Nevertheless, definitions of selected terms are provided for clarity and consistency.

The present application includes the design and optimization of a polymer blend that provides barrier properties to oxygen, water vapor and/or hydrocarbons at a reduced cost.

Accordingly, the present application includes a polymer composition comprising about 32% to 58% w/w of polymer A, about 4% to 20% w/w of polymer B, and about 32% to 48% w/w of polymer C,
wherein the polymer A is the most polar and the polymer C is least polar among the polymer A, the polymer B and the polymer C;
wherein the polymer B has the lowest oxygen permeability among the polymer A, the polymer B and the polymer C; and
wherein the polymer composition has oxygen permeability lower than that of binary blend polymer A and C.

In some embodiments, the polymer A is selected from polyamide (PA), starch/polymer blends, bio-based PET, bio-based PA, polybutylene adipate-co-terephthalate (PBAT), and mixtures thereof. In some embodiments, the polymer A is polyamide. In some embodiments, the polymer A is polybutylene adipate-co-terephthalate.

In some embodiments, the polymer B is selected from low permeability polymers including ethylene vinyl alcohol, polyvinylidene chloride (PVDC), polyamide, polyvinyl alcohol (PVA), and mixtures thereof. In some embodiment, the polymer B is ethylene vinyl alcohol. In some embodiment, the polymer B is polybutylene succinate.

In some embodiments, the polymer C is selected from polyethylene, polypropylene, polylactic acid or polylactide, bio-based polyethylene, bio-based polypropylene, and mixtures thereof. In some embodiments, the polymer C is polyethylene. In some embodiments, the polymer C is polypropylene. In some embodiments, the polymer C is polylactic acid.

In some embodiments, the polymer A is polyamide, the polymer B is ethylene vinyl alcohol, and the polymer C is polyethylene.

In some embodiments, the polymer A is polyamide, the polymer B is ethylene vinyl alcohol, and the polymer C is polypropylene.

In some embodiments, the polymer A is polybutylene adipate-co-terephthalate, the polymer B is polybutylene succinate, and the polymer C ispolylactic acid.

In some embodiments, at least one of the polymer A, the polymer B, and the polymer C is a bioplastic. In some embodiments, at least two among the polymer A, the polymer B, and the polymer C are bioplastics. In some embodiments, the polymer A, the polymer B, and the polymer C are bioplastics.

In some embodiments, the polymer composition of the present application comprises about 32% to 58% w/w of the polymer A, about 4% to 20% w/w of the polymer B, and about 32% to 58% w/w of the polymer C. In some embodiments, the polymer composition of the present application comprises about 42% to 46% w/w of the polymer A, about 8% to 16% w/w of the polymer B, and about 42% to 46% w/w of the polymer C. In some embodiments, the polymer composition of the present application comprises about 44% to 45% w/w of the polymer A, about 10% to 12% w/w of the polymer B, and about 44% to 45% w/w of the polymer C. In some embodiments, the polymer composition of the present application comprises about 45% w/w of the polymer A, about 10% w/w of the polymer B, and about 45% w/w of the polymer C.

It has been found that adding nanoparticles, for example organoclay, to at least one of polymers A, B and C, decreases permeability. In some embodiments, the polymer composition of the present application further comprises nanoparticles, for instance nanoparticles presenting a two-dimensional sheet-like structure. For example, the nanoparticles are chosen from organoclay (also referred to as modified montmorillonite), unmodified montmorillonite (also referred to as nanoclay), graphene and graphene oxide.

In some embodiments, the nanoparticles are dispersed within at least one of the polymer A, the polymer B and the polymer C. For example, the nanoparticles are dispersed within the polymer A. For example, the nanoparticles are dispersed within the polymer B. For example, the nanoparticles are dispersed within the polymer C. For example, the nanoparticles are dispersed within the polymer A and the polymer B. For example, the nanoparticles are dispersed within the polymer A and the polymer C. For example, the nanoparticles are dispersed within the polymer B and the polymer C. For example, the nanoparticles are dispersed within the polymer A, the polymer B and the polymer C.

For example, organoclay is dispersed in polymer B that is polybutylene succinate.

In some embodiments, the nanoparticles are present in about 0.1% to about 15% by weight of the polymer A, the polymer B or the polymer C. In some embodiments, the nanoparticles are present in about 0.1% to about 10% by weight of the polymer A, the polymer B or the polymer C. In some embodiments, the nanoparticles are present in about 0.5% to about 10% by weight of the polymer A, the polymer B or the polymer C. In some embodiments, the nanoparticles are present in about 1% to about 5% by weight of the polymer A, the polymer B or the polymer C.

In one embodiment, the nanoparticles present in the polymer composition of the present application are organoclay.

In another embodiment, the nanoparticles present in the polymer composition of the present application are organoclay; the organoclay is present in about 1% to 5% by weight of the polymer B; and the polymer B is polybutylene succinate.

In some embodiments, the oxygen permeability of the polymer composition of the present application is less than 850 cc·mil/m$^2$·day. In some embodiments, the oxygen permeability of the polymer composition of the present application is less than 700 cc·mil/m$^2$·day. In some embodiments, the oxygen permeability of the polymer composition of the present application is less than 500 cc·mil/m$^2$·day. In some embodiments, the oxygen permeability of the polymer composition of the present application is less than 400 cc·mil/m$^2$·day. In some embodiments, the oxygen permeability of the polymer composition of the present application is less than 300 cc·mil/m$^2$·day. In some embodiments, the oxygen permeability of the polymer composition of the present application is less than 200 cc·mil/m$^2$·day. In some embodiments, the oxygen permeability of the polymer composition of the present application is less than 150 cc·mil/m$^2$·day. In some embodiments, the oxygen permeability of the polymer composition of the present application is less than 100 cc·mil/m²·day. In some embodiments, the oxygen permeability of the polymer composition of the present application is less than 90 cc·mil/m²·day. In some embodiments, the oxygen permeability of the polymer composition of the present application is less than 80 cc·mil/m²·day.

In some embodiments, the oxygen permeability of the polymer composition of the present application is about 5 cc·mil/m²·day to about 850 cc·mil/m²·day. In some embodiments, the oxygen permeability of the polymer composition of the present application is about 5 cc·mil/m²·day to about 700 cc·mil/m²·day. In some embodiments, the oxygen permeability of the polymer composition of the present application is about 5 cc·mil/m²·day to about 500 cc·mil/m²·day. In some embodiments, the oxygen permeability of the polymer composition of the present application is about 5 cc·mil/m²·day to about 300 cc·mil/m²·day. In some embodiments, the oxygen permeability of the polymer composition of the present application is about 5 cc·mil/m²·day to about 200 cc·mil/m²·day. In some embodiments, the oxygen permeability of the polymer composition of the present application is about 25 cc·mil/m²·day to about 150 cc·mil/m²·day. In some embodiments, the oxygen permeability of the polymer composition of the present application is about 50 cc·mil/m²·day to about 100 cc·mil/m²·day. In some embodiments, the oxygen permeability of the polymer composition of the present application is about 55 cc·mil/m²·day to about 90 cc·mil/m²·day.

In some embodiments, the polymer composition of the present application is made by extrusion.

In some embodiments, the polymer composition further comprises one or more compatibilizers.

In some embodiments, the compatibilizers are present in 0.1% to about 20% by weight of the total composition or about 0.1% to about 15% by weight of the total composition. In some embodiments, the compatibilizers are present in about 0.1% to about 10% by weight of the total composition. In some embodiments, the compatibilizers are present in about 0.5% to about 10% by weight of the total composition. In some embodiments, the compatibilizers are present in about 1% to about 5% by weight of the total composition.

In one embodiment, the compatibilizer present in the polymer composition of the present application is polyethylene grafted maleic anhydride (PE-g-MA).

In another aspect, the present application includes a polymer film or sheet comprising the polymer composition of the present application.

In some embodiments, the polymer film or sheet further comprises linear low-density polyethylene (LLDPE), an adhesive and/or a tie (also referred to "tie layer"). In some embodiments, the adhesive is linear low-density polyethylene grafted maleic anhydride (LLDPE-g-MA), low density polyethylene grafted maleic anhydride (LDPE-g-MA) or high density polyethylene grafted maleic anhydride (HDPE-g-MA). In some embodiments, the tie is polypropylene grafted maleic anhydride (PP-g-MA).

The present application includes a polymer composition and a polymer film or sheet that provides permeability to oxygen, water vapor or hydrocarbons at a reduced cost. Accordingly, in another aspect, the present application includes use of the polymer composition of the present application or the polymer film or sheet of the present application in the manufacture or preparation of plastic material and/or plastic packaging.

In another aspect, the present application includes use of the polymer composition of the present application or the polymer film or sheet of the present application in the manufacture or preparation of food packaging.

Accordingly, in another aspect, the present application includes a food packaging comprising the polymer composition of the present application or the polymer film or sheet of the present application.

In an aspect, the present application includes a method of reducing oxygen permeability of plastic material and/or plastic packaging comprising incorporating the polymer application composition of the present application or the polymer film or sheet of the present application in the plastic material and/or plastic package.

EXAMPLES

The following non-limiting examples are illustrative of the present application:

I. General Methods and Materials

HDPE (Sclair™ 19A, Nova Chemicals), PA (Akulon™ F132C1, DSM engineering), tie (PP-g-MA, Admer™ QB520A, Mitsui), Adhesive (LLDPE-g-MA, Bynel™ 4157, Dupont), EVOH (ELVAL F171B, Kuraray), LLDPE (LL3003.32, Exxon Mobile), PP (Ineos H02C-01, Ineos), EVOH (Soarnol, bx6804b, Nippon Gohsei), PLA (Ingeos 4043, Natureworks LLC), PBAT (Exoflex™ F C1200, BASF), PBS (FZ91PM, Mitsubishi Chemicals) and organoclay (Nanomer 130E, Nanocore) were used in preparing blend samples.

PA and EVOH were dried under vacuum at 100° C. overnight to remove moisture. PLA, PBAT, PBS and organoclay were dried under vacuum at 70° C. overnight. Blends and mixtures with organoclay samples were prepared by dry mixing polymers followed by extrusion with a twin-screw extruder (LEISTRITZ Extruder, Germany) with a 18 mm screw and L/D=40. Organoclay was fed through the hopper using a powder feeder. The cast film extrusion of samples comprising PA and EVOH was carried out at a temperature profile of 220-250° C. and screw speed of 150 rpm. The cast film extrusion of samples comprising PBS was carried out at a temperature profile of 170-190° C. and screw speed of 150 rpm. The composition was collected immediately after cast rolls.

Permeability of samples was measured according to ASTM D-3985-81 using Mocon™ OX-TRAN 2/21 series. Permeability measurements were done at 23° C. and 0% relative humidity.

II. Design of Polymer Composition and Morphology

Considering the surface energy and polarity of polymer materials, a blend of three polymers A, B and C can have morphology similar to one exemplified in FIG. 1, where polymer B forms a layer between polymer A and polymer C.

In order to select the proper polymer resins to localize B between A and C, the following equation developed by Harkins (5), which is incorporated herein by reference, can be used:

$$\lambda_{ABC} = \gamma_{AC} [\gamma_{BC} + \gamma_{AB}]$$

where γ shows the interfacial tension between two phases and can be calculated from surface tension data using Harmonic mean equation (6), which is incorporated herein by reference. Based on this approach, polymer B is localized between polymer A and polymer C, only if $\lambda_{ABC}$ is positive.

Figure 2:
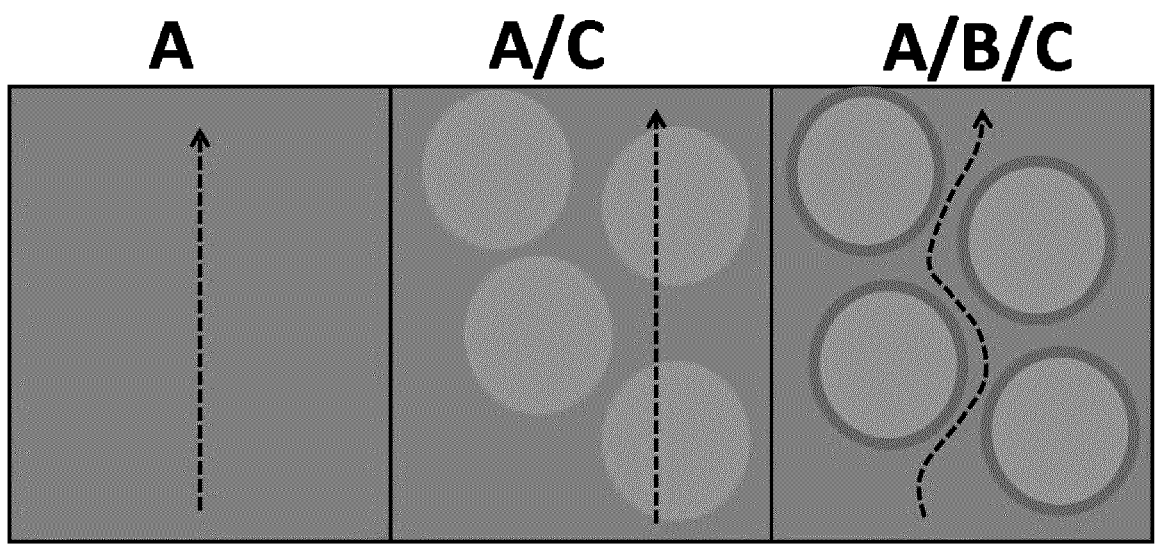
FIG. 2 shows a schematic showing the predicted paths of gas molecules in neat polymer A, blend of polymers A and C, and a composition of polymers A, B and C.

Accordingly, without wishing to be bound by theory, the path of a gas molecule in a system of neat polymer A, of a blend of polymers A and B, and of blend of polymers A, B and C can for example resemble the schematics indicated by the arrows in FIG. 2. The path tortuosity of a gas molecule such as oxygen would increase in a blend of polymers A, B and C due to the low permeability of polymer B to the gas molecule.

III. Example of PA/EVOH/PP and PLA/PBS/PBAT Compositions

For example, for a system of PA, PP and EVOH, the morphology of the composition can be estimated as follows. The surface tension data for PA and PP were taken from literature (7, 8, 9). EVOH is a random copolymer of ethylene and vinyl alcohol and therefore, its surface tension can be determined using mixing law and the interfacial tension of PE and Polyvinyl alcohol known in the art. Using this procedure, the following interfacial tensions can be estimated as shown in Table 1 in a PA/EVOH/PP blend.

TABLE 1

Interfacial tensions in a PA/EVOH/PP blend.

|  | PA/PP | PA/EVOH | EVOH/PP |
|---|---|---|---|
| Interfacial tension (mN/m) | 14 | 1.6 | 8.6 |

By substituting these values in the above equation, it can be seen that $\Delta_{PA/EVOH/PP}=3.9$, which is positive and confirms that EVOH should be localized between PA and PP.

In the case of PLA/PBS/PBAT, the interfacial tensions were taken from the literature (10, 11) and are shown in Table 2 in a PLA/PBAT/PBS blend.

TABLE 2

Interfacial tensions in a PLA/PBAT/PBS blend.

|  | PLA/PBAT | PLA/PBS | PBAT/PBS |
|---|---|---|---|
| Interfacial tension (mN/m) | 0.6 | 0.3 | 0.17 |

By substituting these interfacial tensions in the above equation, $\lambda_{PLA/PBS/PBAT}$ can be calculated as 0.13 which is again a positive value and indicates that PBS should be located between PLA and PBAT.

Figure 3:
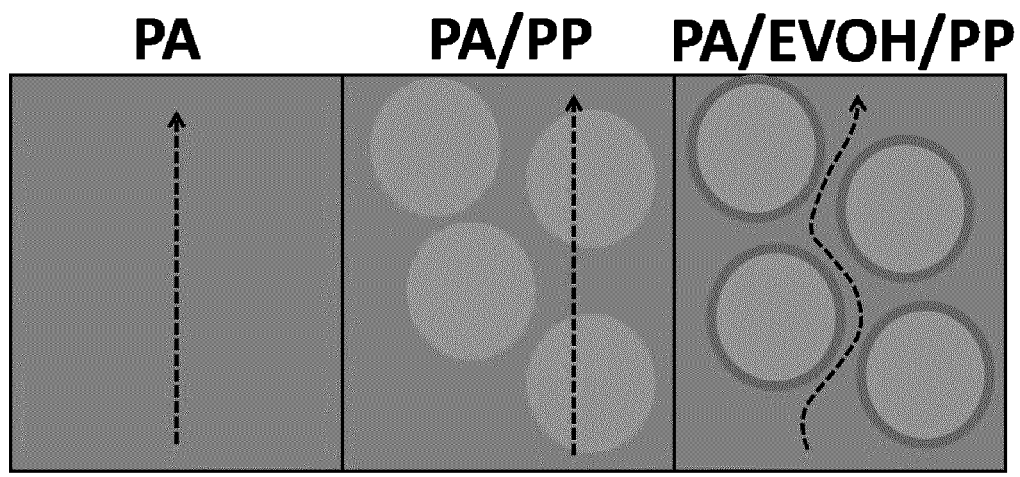
FIG. 3 shows a schematic showing the predicted paths of gas molecules in neat PA, blend of PA and PP, and a composition of PA/EVOH/PP.

As shown in FIG. 3, without wishing to be bound by theory, it is theorized that in a neat PA system, it is likely for a gas molecule to pass through the system without much tortuosity in its path. In a PA/PP blend system, when a gas molecule reaches the PP phase in the blend, due to the much higher oxygen transport rate of PP, it passes through the PP phase. Since PP has an approximately 100 times higher oxygen permeability compare to PA (12), this would result in a much faster gas transport for the PA/PP system, leading to a higher permeability compare to neat PA system. On the other hand, in the system with EVOH located between the PP and PA phases, when a gas molecule reaches the EVOH layer, due to the much lower oxygen permeability of EVOH, it is very likely that the gas molecule does not enter EVOH layer and continues its path in PA phase. Therefore, the presence of EVOH layer around PP phase eliminates the negative effect of low barrier properties of PP phase on the gas permeability. In addition, the tortuosity of oxygen molecules path would increase significantly due to the presence of EVOH. This would result in a longer path for gas molecules. Both these mechanisms lead to a higher barrier properties compared to the PA/PP blend.

IV. Preparation and Assessment of PA/EVOH/PP Composition

PA and EVOH granules were dried at 100° C. overnight in a vacuum oven before processing. PA and PP were dry mixed to achieve PA/PP (50/50% w/w). All polymers were dry mixed to achieve PA/EVOH/PP (45/10/45% w/w). Melt mixing of polymer compositions were done using a twin-screw extruder (LEISTRITZ Extruder, Germany) with a 18 mm screw and L/D=40 at 220-250° C. Single layer of PP and five layer structures of PP/tie/PA/tie/PP, PP/tie/EVOH/tie/PP, PP/tie/(PA/PP (50/50))/tie/PP and PP/tie/(PA/EVOH/PP (45/10/45))/tie/PP were prepared using a multi-layer cast extrusion line. The cast film extrusion was carried out at a temperature profile of 220-250° C. The composition was collected immediately after cast rolls.

Figure 4:
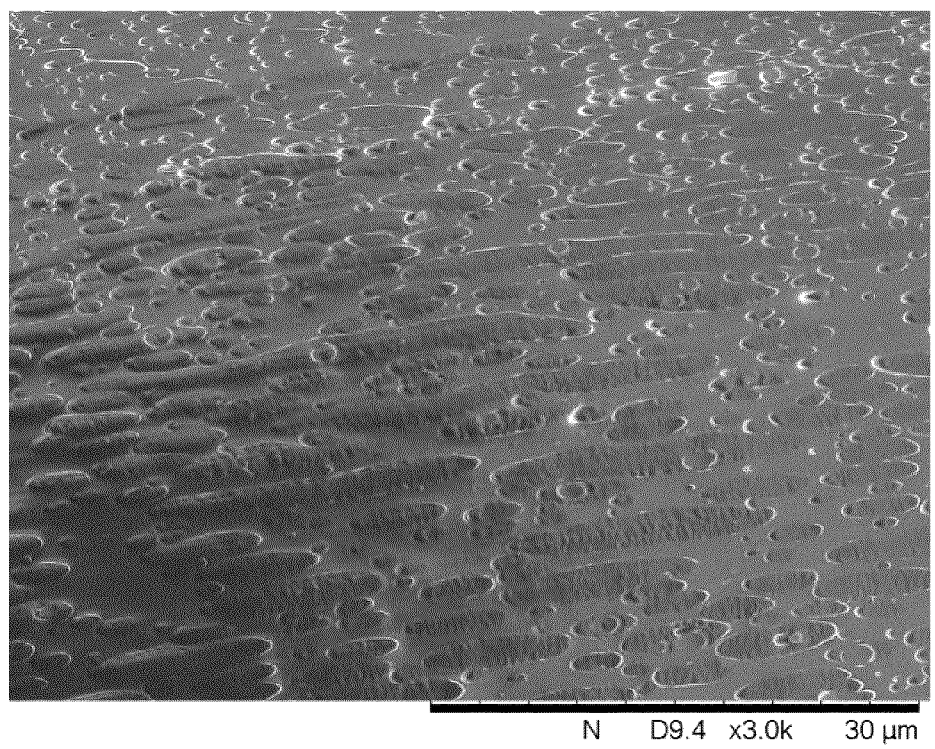
FIG. 4 shows a microscopic image showing the morphology of the cross-section of the polymer composition of PA/EVOH/PP (45/10/45) film.

In order to determine the morphology of cross-section of PA/EVOH/PP, a sample was cut from the film and molded in an epoxy resin. The sample then was cut using a cryo-microtome (Jung RM 2065, Leica) at −150° C. The surface of the sample was then coated with a thin layer of chromium using a sputter coater (Q150Tes, Quorum). The morphology of the cross-section of the sample was then observed using a scanning electron microscope (TM3030, Hitachi) operating at acceleration voltage of 15 kV and working distance of 9.4 mm. The morphology of the PA/EVOH/PP polymer composition is shown in FIG. 4. A layer of EVOH can be seen as white strips between the PP phase (dispersed phase) and the PA phase in FIG. 4 confirming the prediction from surface energy data. Permeability of samples containing PP, PA, EVOH, PP/PA, and PA/EVOH/PP are listed in Table 3.

TABLE 3

Oxygen Permeability of Different Polymers

| Material | Permeability (cc · mil/m² · day) |
|---|---|
| PP | 2370 ± 112 |
| PP/tie/PA/tie/PP | 63 ± 8 |
| PP/tie/EVOH/tie/PP | 0.32 ± 0.11 |
| PP/tie/(PA/PP(50/50))/tie/PP | 487 ± 18 |
| PP/tie/(PA/EVOH/PP (45/10/45))/tie/PP | 72 ± 6 |

The PA/EVOH/PP composition has comparable permeability to PA samples. Considering the price of PA (2.7$/lb), PP (0.65$/lb) and EVOH (3.85$/lb), the final material cost of the ternary blend is calculated as 1.9$/lb, which indicates a 30% decrease in the materials cost. As a result, by replacing PA with the ternary blend, similar permeability results can be obtained at 30% reduced material cost.

V. Preparation of Polymer Filming Comprising Polymer Composition PA/EVOH/HDPE

A blend of PA/HDPE (50/50% w/w) and PA/EVOH/HDPE (45/10/45% w/w) were prepared separately using a twin-screw extruder (Leistritz ZSE 18 Hp, Nuremberg, Germany) with 18 mm screw diameter and L/D ratio of 40 operated at 150 rpm. The processing temperature profile of 220-250° C. was used. Then three different 5-layer films with structure of LLDPE/adhesive/(PA/HDPE)/adhesive/LLDPE, LLDPE/adhesive/(PA/EVOH/HDPE blend)/adhesive/LLDPE and LLDPE/adhesive/PA/adhesive/LLDPE were prepared using a multi-layer cast extrusion line.

Oxygen transmission rate (OTR) was measured using MOCON OX TRAN 2/20 MD instrument. Permeability measurements were done at 23° C. and 0% relative humidity. The results are indicated in Table 4.

TABLE 4

Oxygen permeability of Polymer Films

|  | LLDPE/ adhesive/PA/ adhesive/ LLDPE | LLDPE/adhesive/ (PA/HDPE(50/50))/ adhesive/ LLDPE | LLDPE/adhesive/ (PA/EVOH/ HDPE(45/10/45))/ adhesive/LLDPE |
|---|---|---|---|
| Permeability (cc · mil/m$^2$ · day) | 40 ± 5 | 2790 ± 212 | 68 ± 7 |

The addition of 10% EVOH reduced the oxygen permeability of the PA/HDPE blend to a level comparable to neat PA.

VI. Example of Bioplastic System Using PLA/PBS/PBAT

Bioplastic materials have received significant amount of attention in the recent years because of their renewability and degradability. However, application of bioplastic materials is very limited in packaging industry due to their higher price and poor barrier properties.

Figure 5:
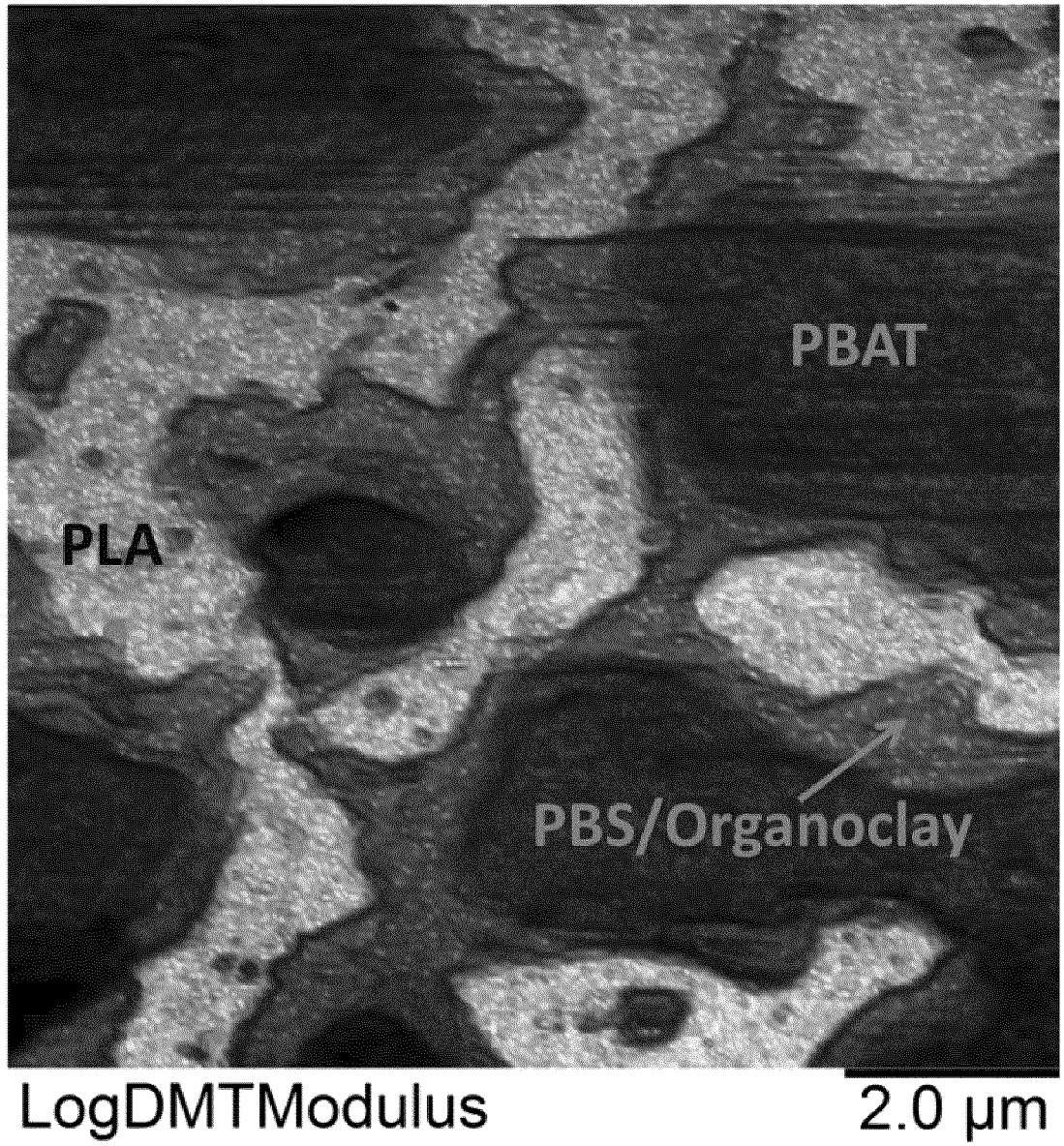
FIG. 5 shows an atomic force microscopy (AFM) image showing the morphology of the cross-section of the polymer composition of PLA/(PBS/nano)/PBAT (45/10/45) film.

First mixture of PBS and 3 wt. % of organoclay (will be referred to as PBS/organoclay hereafter) was prepared using a twin-screw extruder (Leistritz ZSE 18 Hp, Nuremberg, Germany) with 18 mm screw diameter and L/D ratio of 40 operated 150 rpm. The processing temperature profile of 170-190° C. was used. Single layer film samples of PLA/PBAT (50/50% w/w), PBS/organoclay and PLA/(PBS/organoclay)/PBAT (45/10/45% w/w) were prepared using a twin-screw extruder (Leistritz ZSE 18 Hp, Nuremberg, Germany) with 18 mm screw diameter and L/D ratio of 40 operated at 150 rpm. The processing temperature profile of 170-190° C. was used. The morphology of the PLA/(PBS/organoclay)/PBAT (45/10/45) polymer composition is shown in FIG. 5. A layer of PBS/organoclay can be seen as brown phase between the PLA phase (brighter phase) and the PBAT phase (the darker phase) in FIG. 5 confirming the prediction from surface energy data.

Oxygen transmission rate (OTR) was measured using MOCON OX TRAN 2/20 MD instrument, in accordance with ASTM D-3985. Permeability measurements were done at 23° C. and 0% relative humidity. The results are detailed in Table 5.

TABLE 5

Oxygen Permeability of bioplastic Compositions

| Material | Permeability (cc · mil/m$^2$ · day) |
|---|---|
| PLA | 1200 ± 85 |
| PBAT | 1280 ± 112 |
| PBS/3 wt. % organoclay | 320 ± 40 |
| PLA/PBAT (50/50) | 1180 ± 70 |
| PLA/(PBS/organoclay)/PBAT (45/10/45) | 820 ± 60 |

As can be seen, blending of PLA and PBAT does not change noticeably the permeability; however, the addition of only 10 wt. % of PBS/organoclay to the blend reduces the permeability by 30%. This indicates that similar permeability as of PLA/PBAT blend can be obtained by 30% thinner film of PLA/(PBS/organoclay)/PBAT. Considering the very low content of nanoparticles (0.3% of the total weight of film) and the fact that the processing condition of PBS is very similar to PBAT and its costs is marginally higher than PBAT, these results indicate that this strategy can be used to reduce the material cost by approximately 30%.

VII. Preparation of Polymer Filming Comprising Polymer Composition PA/EVOH/HDPE and Compatibilizer PE-g-MA Blends of PA/EVOH/PE-g-MA/HDPE (45/10/4/41 wt. %) were prepared using a twin-screw extruder at a temperature profile of 220-250° C. and a screw speed of 150 rpm. Multilayer films with the structure of (LL+LD)/tie/blend/tie/(LL+LD) were prepared using film blowing method where LL+LD was a mixture of LLDPE and LDPE, tie was polyethylene grafted maleic anhydride (PE-g-MA), and the blend was PA/EVOH/PE-g-MA/HDPE prepared by the twin-screw extruder in the previous step. Film samples with different thicknesses of the blend layer were produced by changing the extruder speed of the blend layer. In addition, multilayer samples with structure of (LL+LD)/tie/PA/tie/(LL+LD) were prepared as control samples to compare permeability results. The thickness of the blend and PA layers in the film samples were determined using transmission optical microscopy of the cross-section of samples. Oxygen permeability of the prepared samples with different thicknesses were measured. The results are listed in Table 6.

TABLE 6

Oxygen Permeability and thickness of Compositions with compatibilizer

| Middle Layer Material in the Multilayer Film | Thickness of the middle layer (μm) | Permeability (cc · mil/m$^2$ · day) |
|---|---|---|
| PA/EVOH/PE-g-MA/HDPE | 13 | 30 |
| PA | 12 | 35 |
| PA/EVOH/PE-g-MA/HDPE | 30 | 28 |
| PA | 30 | 32 |
| PA/EVOH/PE-g-MA/HDPE | 60 | 35 |
| PA | 60 | 33 |

The obtained results indicate that the formulation has permeability similar to PA even when used as a thin 13 μm layer in multilayer films. This confirms the efficacy of the formulation in replacing PA layer in flexible packaging as a thin layer of PA is commonly used in flexible packaging applications.

While the present application has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

FULL CITATIONS FOR DOCUMENTS REFERRED TO IN THE APPLICATION (1) Subramanian, P. M., (Permeability barriers by controlled morphology of polymer blends. Polymer Engineering & Science, 1985. 25(8): p. 483-487).
(2) Subramanian, P. M. and V. Mehra, Laminar morphology in polymer blends: Structure and properties. Polymer Engineering & Science, 1987. 27(9): p. 663-668.
(3) Kamal, M. R., et al., The development of laminar morphology during extrusion of polymer blends. Polymer Engineering & Science, 1995. 35(1): p. 41-51.

(4) Kamal, M. R. W., CA), Lohfink, Gunter (Brussels, BE), Arghyris, Laurent (Montreal, CA), Hozhabr-ghelichi, Sassan (Montreal, CA), Process for laminar pollymer extrusion. 1993, The Royal Institution for the Advancement of Learning (McGill University) (Montreal, CA): United States.
(5) Harkins, W. D. and A. Feldman, FILMS. THE SPREADING OF LIQUIDS AND THE SPREADING COEFFICIENT. Journal of the American Chemical Society, 1922. 44(12): p. 2665-2685.
(6) Wu, S., Calculation of interfacial tension in polymer systems. Journal of Polymer Science Part C: Polymer Symposia, 1971. 34(1): p. 19-30.
(7) Berger G. R., Steffel C., Friesenbichler, AIR conference proceedings, 1779 (2016), P. 20006
(8) Khoshkava V., Kamaml M. R., Biomacromolecules (2013), 14, 3155.
(9) Jalali Dil E., Favis B. D., Polymer (2015), 77, 156
(10) Jalali Dil, E., P. J. Carreau, and B. D. Favis, Morphology, miscibility and continuity development in poly(lactic acid)/poly(butylene adipate-co-terephthalate) blends. Polymer, 2015. 68: p. 202-212.
(11) Zolali, A. M. and B. D. Favis, Partial to complete wetting transitions in immiscible ternary blends with PLA: the influence of interfacial confinement. Soft Matter, 2017. 13(15): p. 2844-2856.
(12) Robertson, G. L., Food packaging: principles and practice. 2016: CRC press.

The invention claimed is:

1. A polymer composition comprising about 40% to 48% w/w of polymer A, about 4% to 20% w/w of polymer B, and about 40% to 48% w/w of polymer C, based on total weight of the composition,
wherein the polymer A is the most polar among the polymer A, the polymer B and the polymer C;
wherein the polymer C is the least polar among the polymer A, the polymer B and the polymer C;
wherein the polymer B has the lowest oxygen permeability among the polymer A, the polymer B and the polymer C; and
wherein the polymer composition has oxygen permeability lower than that of binary blend polymer A and C;
wherein the polymer A is polyamide (PA);
wherein the polymer B is ethylene vinyl alcohol (EVOH); and
wherein the polymer C is selected from polyethylene, polypropylene and mixtures thereof; and
wherein the polymer A and polymer C are in a ratio w/w of about 1.

2. The polymer composition of claim 1, comprising about 42% to 46% w/w of the polymer A, about 8% to 16% w/w of the polymer B, and about 42% to 46% w/w of the polymer C.

3. The polymer composition of claim 1, comprising about 44% to 45% w/w of the polymer A, about 10% to 12% w/w of the polymer B, and about 44% to 45% w/w of the polymer C.

4. The polymer composition of claim 1, wherein the oxygen permeability is less than 200 cc·mil/m$^2$·day.

5. The polymer composition of claim 1, wherein the oxygen permeability is less than 80 cc·mil/m$^2$·day.

6. The polymer composition of claim 1, wherein the oxygen permeability is between about 5 cc·mil/m$^2$·day to about 200 cc·mil/m$^2$·day.

7. The polymer composition of claim 1, wherein the oxygen permeability is between about 50 cc·mil/m$^2$·day to about 100 cc·mil/m$^2$·day.

* * * * *